(12) United States Patent
Casey

(10) Patent No.: US 10,488,151 B1
(45) Date of Patent: Nov. 26, 2019

(54) BUTT STOCK ASSEMBLY FOR A RIFLE

(71) Applicant: Sean Patrick Casey, Oklahoma City, OK (US)

(72) Inventor: Sean Patrick Casey, Oklahoma City, OK (US)

( * ) Notice: Subject to any disclaimer, the term of this patent is extended or adjusted under 35 U.S.C. 154(b) by 0 days.

(21) Appl. No.: 16/548,547

(22) Filed: Aug. 22, 2019

Related U.S. Application Data

(60) Provisional application No. 62/721,250, filed on Aug. 22, 2018.

(51) Int. Cl.
*F41C 23/22* (2006.01)
*H04N 5/232* (2006.01)
*F41C 23/20* (2006.01)
*H04N 7/18* (2006.01)

(52) U.S. Cl.
CPC .............. *F41C 23/22* (2013.01); *F41C 23/20* (2013.01); *H04N 5/23293* (2013.01); *H04N 7/18* (2013.01)

(58) Field of Classification Search
CPC ........... F41C 23/06; F41C 23/22; F41C 23/20
USPC ....................................................... 42/71.01
See application file for complete search history.

(56) References Cited

U.S. PATENT DOCUMENTS

| | | | | |
|---|---|---|---|---|
| 6,598,329 B1 * | 7/2003 | Alexander | .............. | F41C 23/04 42/114 |
| 8,707,603 B2 * | 4/2014 | Troy | ....................... | F41C 23/22 42/71.01 |
| 2007/0115955 A1 * | 5/2007 | Byer | ....................... | F41C 23/22 370/360 |

\* cited by examiner

*Primary Examiner* — Reginald S Tillman, Jr.
(74) *Attorney, Agent, or Firm* — Plager Schack LLP; Mark H. Plager; Michael J. O'Brien

(57) ABSTRACT

A butt stock assembly for a rifle having a rifle sight. The butt stock assembly includes a butt stock hollowed with a camera compartment and a battery compartment. A display compartment is rotationally attached to the battery compartment. A display is housed in the display compartment and electrically coupled to a battery in the battery compartment and a camera in the camera compartment. A microprocessor is communicatively coupled to the display and the camera, The microprocessor is programmed with instructions to receive a visual input from the camera including the rifle sight. Then, produce an image the rifle sight on the display. The visual input enables a user to determine where the rifle is pointed without having the user to be aligned with the rifle sight.

2 Claims, 4 Drawing Sheets

BUTT STOCK ASSEMBLY FOR A RIFLE

RELATED APPLICATION

This application claims priority to provisional patent application U.S. Ser. No. 62/721,250 filed on Aug. 22, 2018, the entire contents of which is herein incorporated by reference.

BACKGROUND

Embodiments of the disclosed invention relate to firearm accessories.

Prior to embodiments of the disclosed invention, shooting around corners was difficult because firearms lacked a sufficient line of sight. Embodiment of the disclosed invention solve this problem.

SUMMARY

A butt stock assembly for a rifle having a rifle sight. The butt stock assembly includes a butt stock hollowed with a camera compartment and a battery compartment. A display compartment is rotationally attached to the battery compartment. A display is housed in the display compartment and electrically coupled to a battery in the battery compartment and a camera in the camera compartment. A microprocessor is communicatively coupled to the display and the camera, The microprocessor is programmed with instructions to receive a visual input from the camera including the rifle sight. Then, produce an image the rifle sight on the display. The visual input enables a user to determine where the rifle is pointed without having the user to be aligned with the rifle sight.

In some embodiments, the camera is arranged in an exact parallax of sights to give an exact sighting for accurate shooting.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
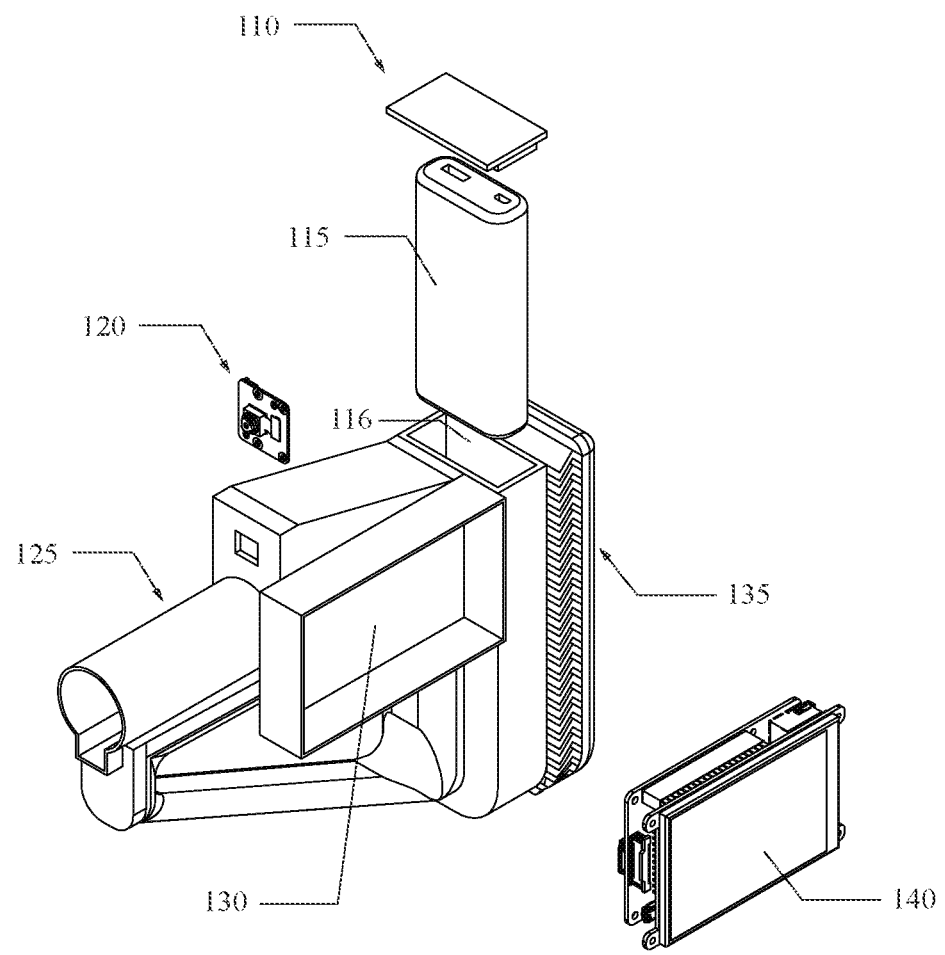
FIG. 1 shows an assembly view of one embodiment of the present invention.
Figure 2:
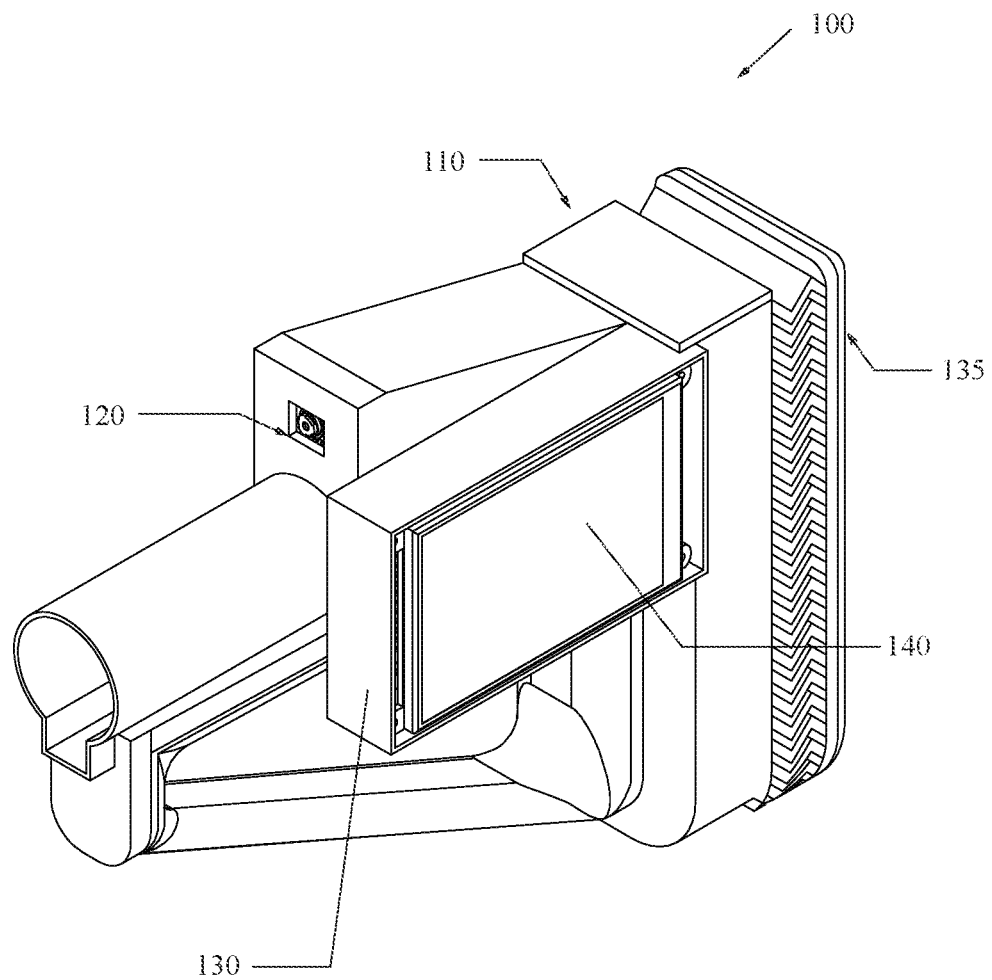
FIG. 2 shows a perspective view of one embodiment of the present invention.
Figure 3:
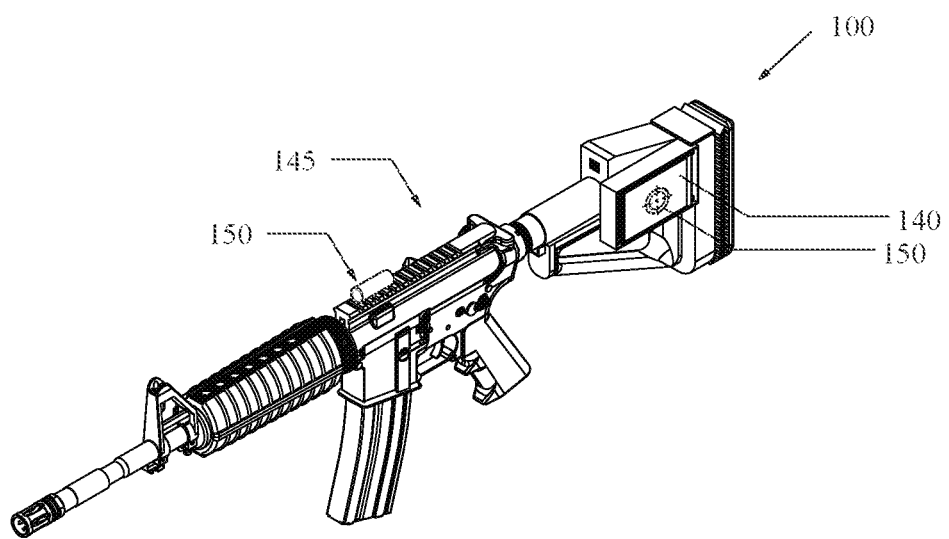
FIG. 3 shows a perspective view of one embodiment of the present invention shown in use.

By way of example, and referring to FIGS. 1-3, one embodiment of butt stock assembly 100 is configured to increase a line of sight from a rifle 145 having a rifle sight 150. The butt stock assembly 100 further comprises a butt stock 125 hollowed with a battery compartment 116 and a camera compartment 118. A butt plate 135 is arranged adjacent to the battery compartment 116. The battery compartment 116 houses a battery 115 and is sealed with a battery compartment cover plate 110.

The camera compartment 118 houses a camera 120. The camera compartment should be built to prevent vibration damage to the camera 120. A display compartment 130 is rotationally coupled to the battery compartment 116 with a hinge. The display compartment houses a display 140.

The display 140 is electrically coupled to the battery 115 and the camera 120. The display 140 can be communicatively coupled to a processor 210 and programmed with instructions to: receive a visual input from the camera 120 including the rifle sight 150. Then, produce an image the rifle sight 150 on the display 140. This enables a user to determine where the rifle 145 is pointed without necessarily having the user to be aligned with the rifle sight 150. This can be useful for firing a rifle around a corner.

Figure 4:
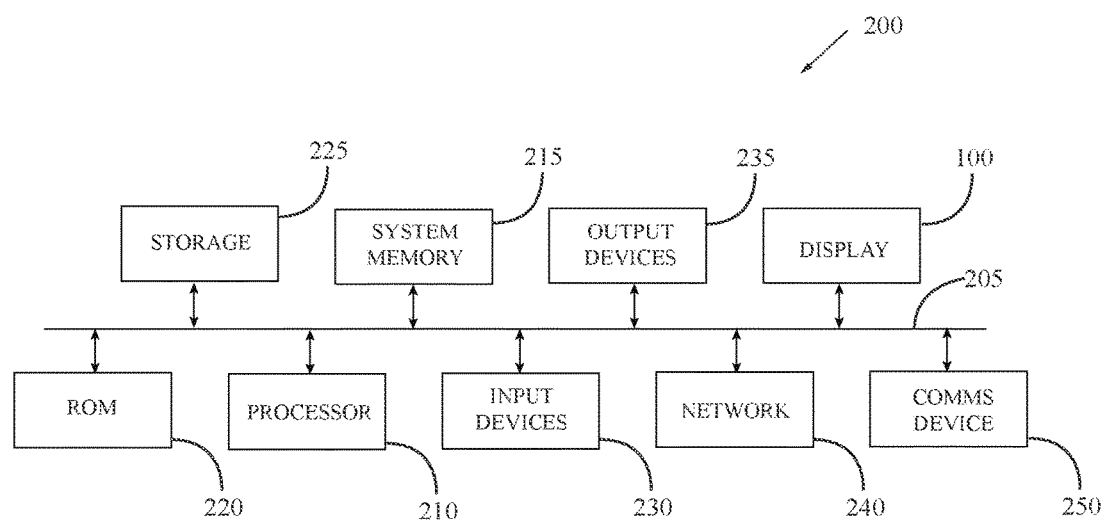
FIG. 4 shows a schematic of one embodiment of the present invention.

FIG. 4 conceptually illustrates an electronic system 200 with which some embodiments of the invention are implemented. The electronic system 200 may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, and a network 240.

The bus 205 collectively represents all system, peripheral, and chipset buses that communicatively connect the numerous internal devices of the electronic system 200. For instance, the bus 205 communicatively connects the processing unit(s) 210 with the read-only 220, the system memory 215, and the permanent storage device 225.

From these various memory units, the processing unit(s) 210 retrieves instructions to execute and data to process in order to execute the processes of the invention. The processing unit(s) may be a single processor or a multi-core processor in different embodiments. The processing unit(s) need not be local and could include drone technology to create domes around stadiums and perimeters.

The read-only-memory (ROM) 220 stores static data and instructions that are needed by the processing unit(s) 210 and other modules of the electronic system. The permanent storage device 225, on the other hand, is a read-and-write memory device. This device is a non-volatile memory unit that stores instructions and data even when the electronic system 200 is off. Some embodiments of the invention use a mass-storage device (such as a magnetic or optical disk and its corresponding disk drive) as the permanent storage device 225.

Other embodiments use a removable storage device (such as a floppy disk or a flash drive) as the permanent storage device 225. Like the permanent storage device 225, the system memory 215 is a read-and-write memory device. However, unlike permanent storage device 225, the system memory 215 is a volatile read-and-write memory, such as a random access memory. The system memory 215 stores some of the instructions and data that the processor needs at runtime. In some embodiments, the invention's processes are stored in the system memory 215, the permanent storage device 225, and/or the read-only 220. For example, the various memory units include instructions for processing appearance alterations of displayable characters in accordance with some embodiments. From these various memory units, the processing unit(s) 210 retrieves instructions to execute and data to process in order to execute the processes of some embodiments.

The bus 205 also connects to the input devices 230 and the output devices 235. The input devices enable the person to communicate information and select commands to the electronic system. The input devices 230 include alphanumeric keyboards and pointing devices (also called "cursor control devices"). The output devices 235 display images generated by the electronic system 200. The output devices 235 include printers and display devices, such as cathode ray tubes (CRT) or liquid crystal displays (LCD) including display 140. Some embodiments include devices such as a touchscreen that functions as both input and output devices. A pole extension can be used for LED lighting.

Finally, as shown in FIG. 4, bus 205 also couples the electronic system 200 to a network 240 through a network adapter (not shown). In this manner, the computer can be a part of a network of computers (such as a local area network ("LAN"), a wide area network ("WAN"), or an intranet), or a network of networks (such as the Internet). Any or all components of electronic system 200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

One example of this system can be built from: a 3.5 inch micro display tv (or any sized display); a raspberry pi 3 (or any other microcontroller); a V2 Micro Noir camera (or any micro camera); a butt stock housing piece; an extension ribbon cable; a USB battery pack.

A butt stock housing piece can be joined to the rifle 145. A micro display can be mounted to the side of the butt stock with a hinge and connected to the processor 210 with wire. The micro display screen is mounted on the butt stock housing piece and transmits live imaging from the camera 120. The camera 120 is connected to the processor 210 which can be housed in the butt stock housing piece. The butt stock assembly 100 can be powered by a USB battery pack which is connected to the processor 210. Both the processor 210 and the battery pack are configured to be packed inside the butt stock housing. The embodiment can also be re configured for a side mounted TV display on a picatinny rail with a picatinny rail adapter and a ribbon extension cable.

A Raspberry Pi 3 can used for programming connected to the camera and screen. The motherboard will be programmed to communicate with the camera and screen. The butt stock can be custom made and assembled to house the device as described. The display is than mounted either on a picatinny rail or housed in the buttstock.

The embodiment can also have wireless parts, bullet proof glass protection and housing for the screen and a more evolved stock housing. Additionally, optically night vision, thermal and other affects can be added.

In some embodiments, the camera could be moved to the front of the gun, the screen could be larger and custom mother boards could be used. The original model used will be a AR15 so other gun systems could be developed. Additionally, all in one system entirely in a butt stock with the display tv in the butt stock is also possible.

The embodiment will have an option to interchange the butt stock and mount the camera on the side of the gun depending on dexterity and handiness. A person behind the camera or obstacles, can peek the barrel around and watch the screen via the camera behind their sights. This also enables the ability to shoot with sights down range.

This can technology can also be used for heads up displays mounted in helmets enabling hip fire, drone technology or automated shooting.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, 116.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A butt stock assembly for a rifle having a rifle sight; the butt stock assembly comprising:
- a butt stock hollowed with a camera compartment and a battery compartment;
- a display compartment, rotationally attached to the battery compartment;
- a display, housed in the display compartment and electrically coupled to a battery in the battery compartment and a camera in the camera compartment;
- a microprocessor, communicatively coupled to the display and the camera; wherein the microprocessor is programmed with instructions to:
  - receive a visual input from the camera including the rifle sight;
  - produce an image the rifle sight on the display
- wherein the visual input enables a user to determine where the rifle is pointed without having the user to be aligned with the rifle sight.

2. The butt stock assembly of claim 1, wherein the camera is arranged in an exact parallax of sights to give an exact sighting for accurate shooting.

* * * * *